United States Patent
Serkh et al.

(10) Patent No.: US 6,607,459 B1
(45) Date of Patent: Aug. 19, 2003

(54) LINEAR TENSIONER

(75) Inventors: Alexander Serkh, Troy, MI (US); Ali Kanberoglu, Clarkston, MI (US); Andrzej Dec, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 13 days.

(21) Appl. No.: 09/790,766

(22) Filed: Feb. 20, 2001

(51) Int. Cl.⁷ .................. F16H 7/12; F16H 7/14
(52) U.S. Cl. .................. 474/138; 474/117; 474/135
(58) Field of Search ................ 474/135–139, 474/114–117, 118–119, 133, 101, 109–110

(56) References Cited

U.S. PATENT DOCUMENTS

| | | | | |
|---|---|---|---|---|
| 2,480,294 A | * | 8/1949 | Hume | 474/138 |
| 3,575,058 A | * | 4/1971 | Kraus | 474/134 |
| 4,145,934 A | * | 3/1979 | Sragal | 474/135 |
| 4,362,525 A | | 12/1982 | Sproul | 474/117 |
| 4,402,677 A | * | 9/1983 | Radocaj | 474/138 |
| 5,045,029 A | | 9/1991 | Dec et al. | 474/112 |
| 5,073,148 A | | 12/1991 | Dec | 474/94 |
| 5,370,585 A | | 12/1994 | Thomey et al. | 474/112 |
| 5,938,552 A | * | 8/1999 | Serkh | 474/117 |

FOREIGN PATENT DOCUMENTS

| | | | | | |
|---|---|---|---|---|---|
| EP | 349814 A | * | 1/1990 | | 474/117 |
| GB | 696586 A | * | 9/1953 | | 474/138 |
| GB | 721768 A | * | 1/1955 | | 474/138 |
| GB | 2090938 A | * | 7/1982 | | 474/138 |

* cited by examiner

Primary Examiner—Marcus Charles
(74) Attorney, Agent, or Firm—J. A. Thurnau, Esq.; C. H. Castleman, Esq.; S. G. Austin, Esq.

(57) ABSTRACT

A tensioner having a base. A spring connected to the base biases a plate, having a pulley, toward a belt. Frictional blocks are aligned on the base in a staggered fashion along a spring centerline. The plate slidingly moves in a linear path between the blocks. The blocks constrain the path of the plate allowing movement in only a single axis parallel to a spring axis. A hubload from a belt running on the pulley combined with the spring force acting on the plate creates a force couple acting on the plate through the frictional blocks. The engaging surfaces between the plate and the blocks have a predetermined coefficient of friction thereby creating a damping force as the pulley and plate move in a linear path on the blocks.

12 Claims, 6 Drawing Sheets

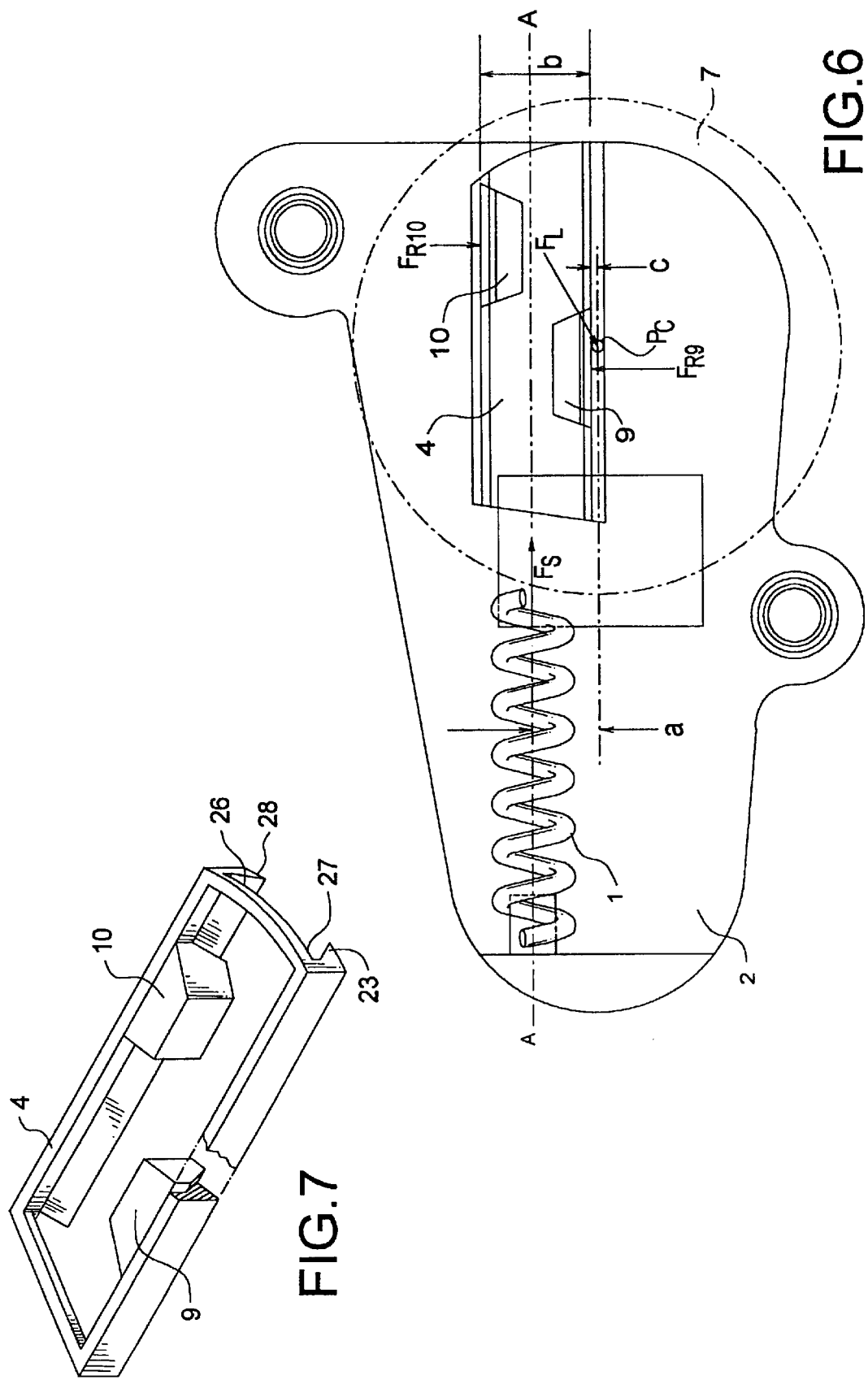

LINEAR TENSIONER

FIELD OF THE INVENTION

The invention relates to tensioners, more particularly to linear tensioners having damping of a pulley movement by linear bearings.

BACKGROUND OF THE INVENTION

Most engines used for automobiles and the like include a number of belt driven accessory systems which are necessary for the proper operation of the vehicle. The accessory systems may include an alternator, air conditioner compressor and a power steering pump.

The accessory systems are generally mounted on a front surface of the engine. Each accessory has a pulley mounted on a shaft for receiving power from some form of belt drive. In early systems, each accessory was driven by a separate belt that ran between the accessory and the crankshaft. Due to improvements in belt technology, single serpentine belts are now generally used in most applications. A single serpentine belt routed among the various accessory components drives the accessories. The engine crankshaft drives the serpentine belt.

Since the serpentine belt must be routed to all accessories, it has generally become longer than its predecessors. To operate properly, the belt is installed with a pre-determined tension. As it operates, it stretches slightly over its length. This results in a decrease in belt tension, which may cause the belt to slip. Consequently, a belt tensioner is used to maintain the proper belt tension as the belt stretches during use.

As a belt tensioner operates, the running belt may excite oscillations in the tensioner spring. These oscillations are undesirable, as they cause premature wear of the belt and tensioner. Therefore, a damping mechanism is added to the tensioner to damp operational oscillations.

Various damping mechanisms have been developed. They include viscous fluid dampers, mechanisms based on frictional surfaces sliding or interaction with each other, and dampers using a series of interacting springs.

Representative of the art is U.S. Pat. No. 4,362,525 (1982) to Sproul that discloses a tensioner having a camming block that engages an angled surface on a base. As the tensioner arm moves the camming block moves against the angled surface having a frictional coefficient thereby providing a damping force on the arm.

The prior art tensioners are complex requiring several components. They also do not provide design flexibility by orienting components to take advantage of the mechanical relationship between the belt and the frictional components. Prior art tensioners also generally impart an arcuate motion to the pulley center. Finally, the prior art tensioners do not utilize linear damping bearings.

What is needed is a tensioner having a linear bearing. What is needed is a tensioner having a damping linear bearing. What is needed is a tensioner having frictional blocks that impart damping in response to linear movement of a pulley plate. What is needed is a tensioner having damping determined by a force couple acting on frictional blocks engaging a pulley plate. The present invention meets these needs.

SUMMARY OF THE INVENTION

The primary aspect of the invention is to provide a tensioner having a linear bearing.

Another aspect of the invention is to provide a tensioner having a damping linear bearing.

Another aspect of the invention is to provide a tensioner having frictional blocks that impart damping in response to linear movement of a pulley plate.

Another aspect of the invention is to provide a tensioner having damping determined by a force couple acting on frictional blocks engaging a pulley plate.

Other aspects of the invention will be pointed out or made obvious by the following description of the invention and the accompanying drawings.

The invention comprises a tensioner having a base. A spring connected to the base biases a plate, having a pulley, toward a belt. Frictional blocks are aligned on the base in a staggered fashion along a spring centerline. The plate slidingly moves in a linear path between the blocks. The blocks constrain the path of the plate allowing movement in only a single axis generally parallel to a spring axis. A hubload from a belt running on the pulley combined with the spring force acting on the plate creates a force couple acting on the plate through the frictional blocks. The engaging surfaces between the plate and the blocks have a predetermined coefficient of friction thereby creating a damping force as the pulley and plate move in a linear path on the blocks.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 6 is a partial plan view of the invention.

FIG. 7 is a partial cut-away detail of the plate and blocks.

DETAILED DESCRIPTION OF THE PREFERRED EMBODIMENT

Figure 1:
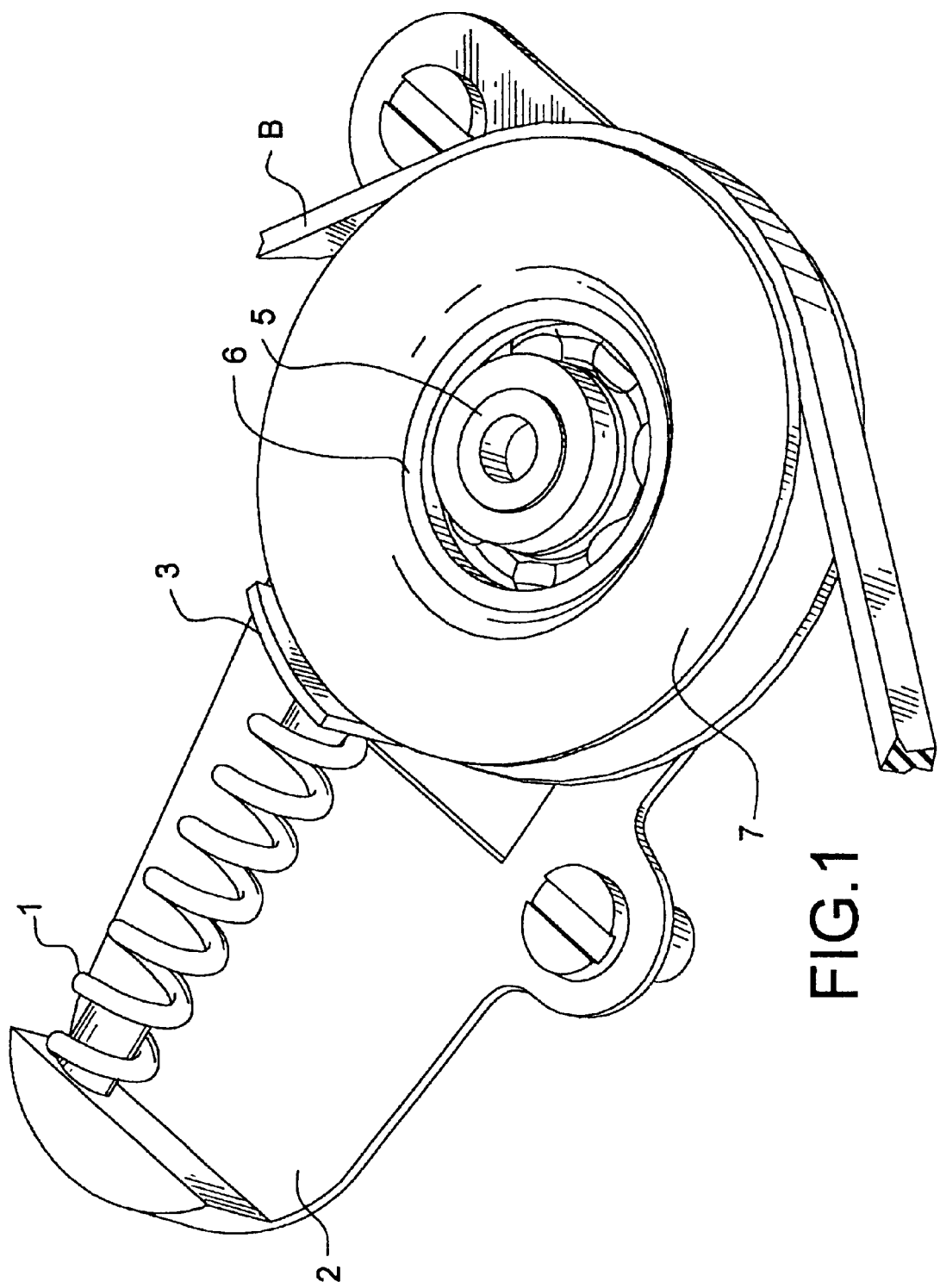
FIG. 1 is a top perspective view of the invention.

FIG. 1 is a top perspective view of the invention. Biasing member or spring 1 is attached to a base 2 and tang 3. Tang 3 is fixedly attached to plate 30 (not shown). Plate 30 is mounted to sliding plate 4 (not shown). Axle 5 is mounted to plate 30. Pulley bearing 6 is mounted to axle 5. Pulley 7 is mounted to bearing 6. Belt B is trained about pulley 7. Spring 1 in the preferred embodiment comprises a helical coil spring, but may also comprise any suitable biasing component known in the art, for example, a pneumatic or hydraulic piston.

Figure 2:
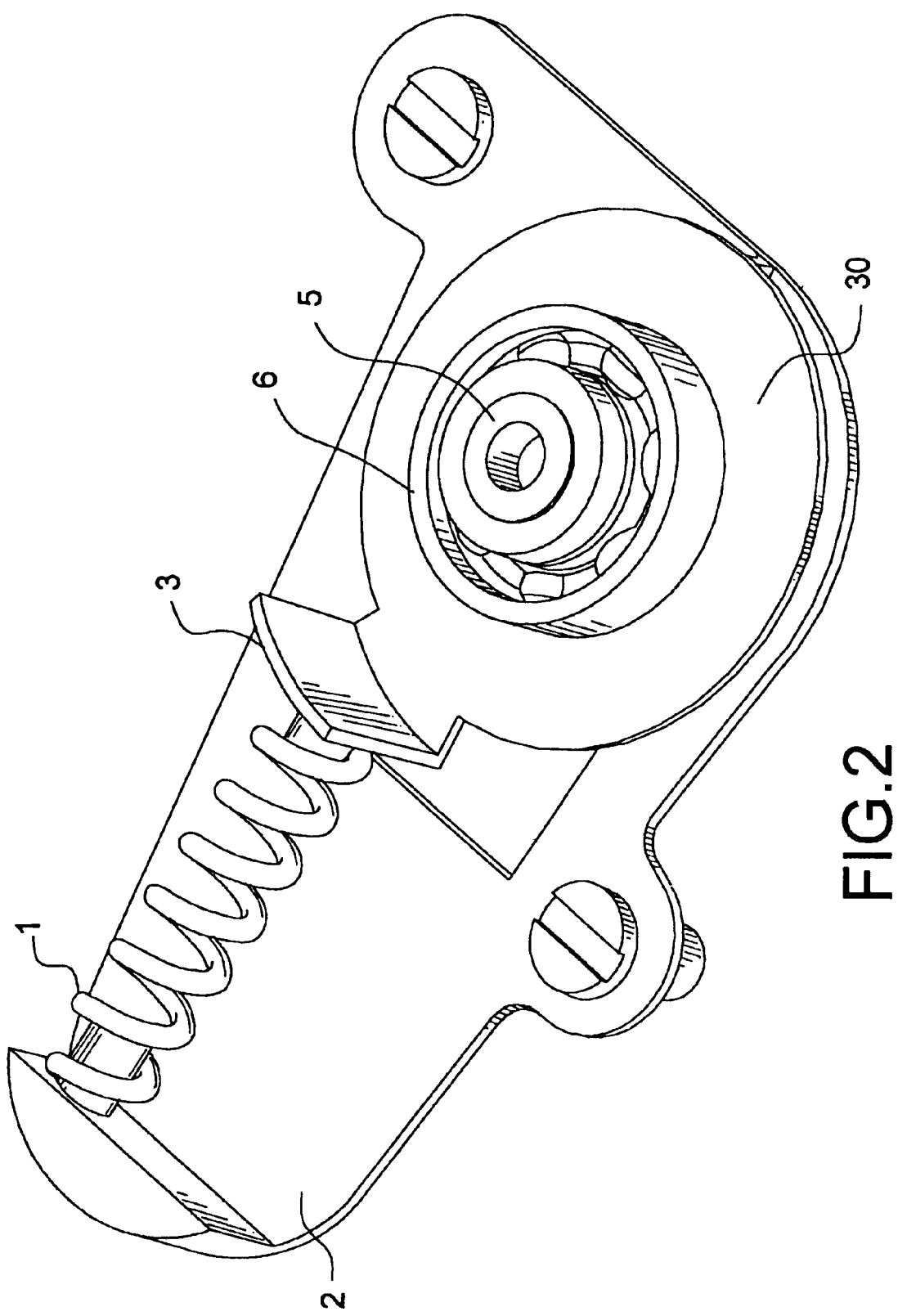
FIG. 2 is a top partial perspective view of the invention.

FIG. 2 is a top partial perspective view of the invention. The tensioner is shown without the pulley 7. Axle 5 and tang 3 are mounted to plate 30. Plate 4 is not shown.

Figure 3:
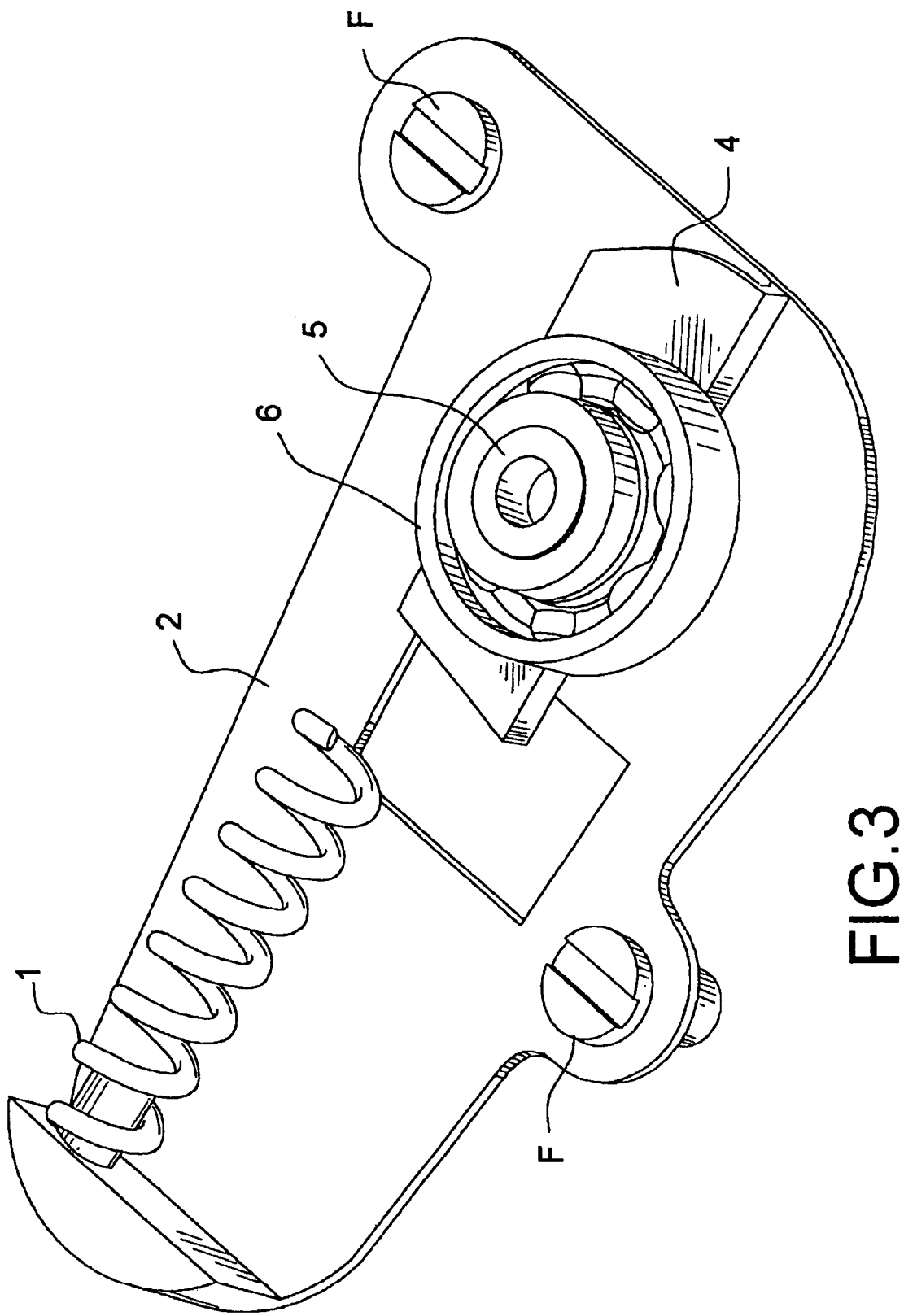
FIG. 3 is a top partial perspective view of the invention.

FIG. 3 is a top partial perspective view of the invention. Plate 30 is omitted to provide a view of the plate 4 slidingly mounted to base 2. Fasteners F attach the tensioner to any appropriate surface for use.

Figure 4:
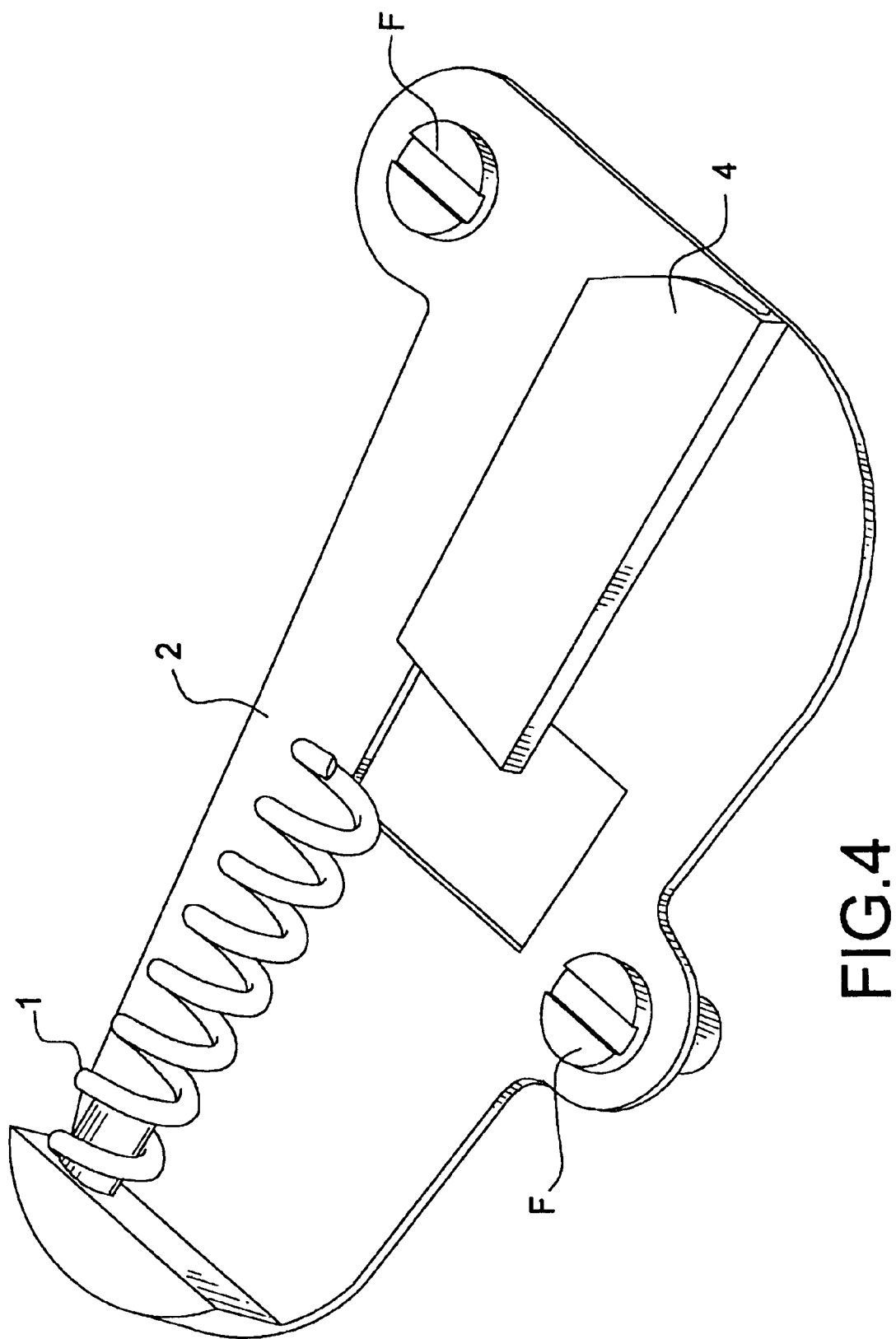
FIG. 4 is a top partial perspective view of the invention.

FIG. 4 is a top partial perspective view of the invention. Axle 5, bearing 6, pulley 7 and plate 30 are each omitted to shown plate 4 slidingly mounted to base 2.

Figure 5:
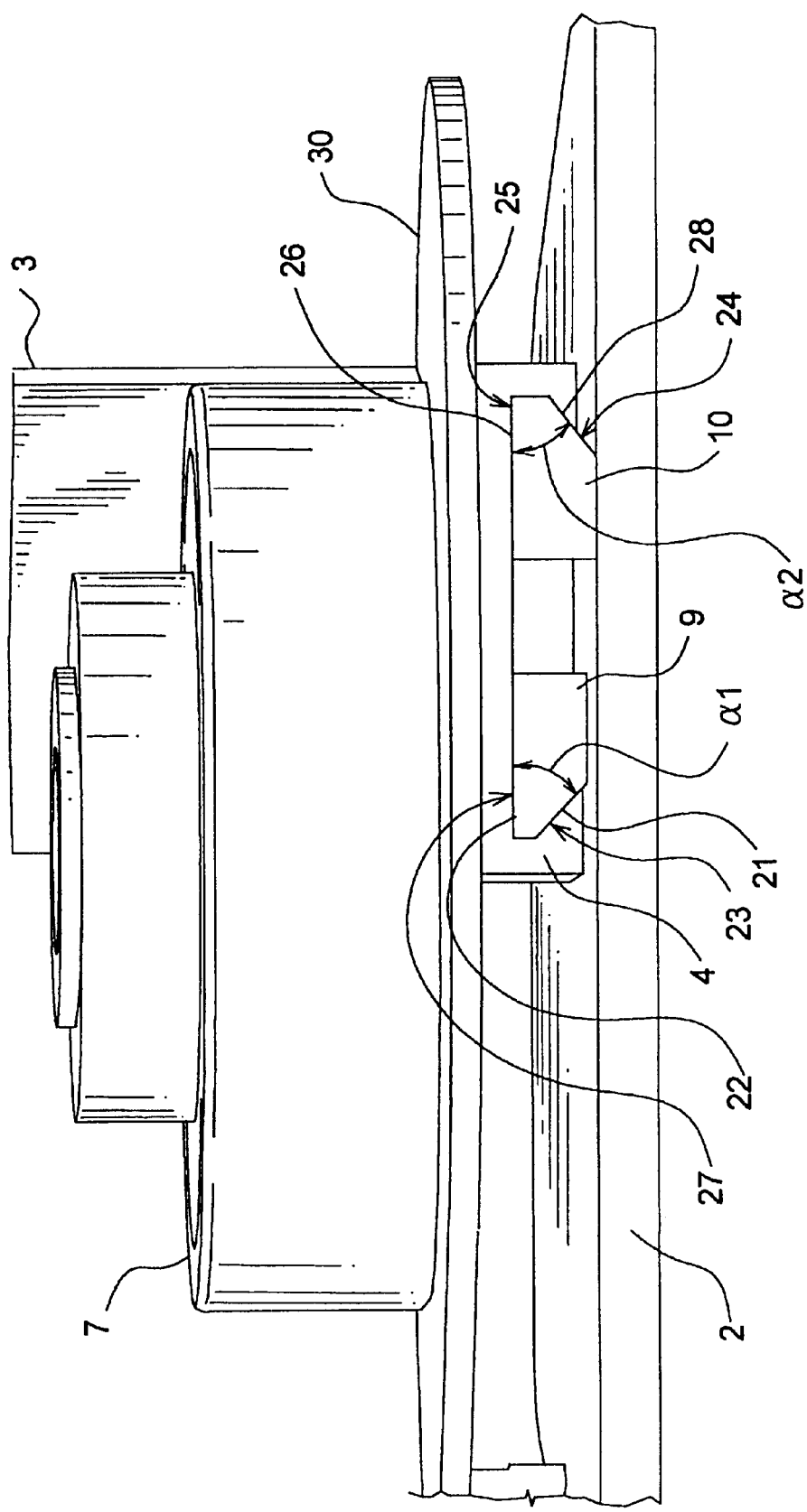
FIG. 5 is an end elevation view of the invention.

FIG. 5 is an end elevation view of the invention. Plate 4 is shown engaged to block 9 and block 10. Blocks 9, 10, also referred to as frictional members, are fixedly attached to base 2. Blocks 9, 10 are displaced on opposing sides of spring axis A—A. Block 9 describes angle a1 between frictional member engaging surfaces 21, 22. Plate engaging surfaces 23, 27 on plate 4 slidingly engage frictional member engaging surfaces 21, 22, respectively. Block 10 describes angle α2 between frictional member engaging surfaces 24, 25. Plate engaging surfaces 26, 28 on plate 4 slidingly engage frictional member engaging surfaces 25, 24, respectively. See FIG. 7 for a partial cut-away detail of plate 4 and blocks 9, 10.

Surfaces 21, 22, 23, 24, 25, 26, 27, and 28 may comprise any frictional material known in the art, including but not limited to nylon or PTFE, each therefore having pre-determined coefficients of friction. In the preferred embodiment angle α1 and angle α2 are equal, but may also differ depending upon the needs of a user.

FIG. 6 is a partial plan view of the invention. This view depicts the tensioner as shown in FIG. 4 with the exception that the plate 4 is omitted to show the relationship between the blocks 9, 10 and spring 1. Block 9 and block 10 are staggered different distances from spring 1 along spring axis A—A. The blocks are also separated from each other by distance b transverse to spring axis A—A. Pulley center $P_c$ is offset normally from the spring axis A—A by an offset distance a and is offset from an edge of block 9 by distance c. Distance a is greater than a distance for block 9 frictional engaging surface from spring axis A—A.

In operation, a belt having a tension is trained about pulley 7 which creates a hubload force $F_L$ acting at $P_c$, which in turn operates on axle 5 and thereby on plate 4. A spring force vector $F_S$ operates to counter hubload force $F_L$, which generates reaction forces $F_{R9}$ and $F_{R10}$ which in turn operate on blocks 9, 10. Plate 4 is constrained to move linearly along a fixed path parallel to spring axis A—A between blocks 9, 10. The forces $F_{R9}$ and $F_{R10}$ are generally referred to as $F_R$.

Since the tensioner may be assumed to be in static equilibrium for the purposes of analysis, the vectors may be added to give the reaction force vectors $F_{R9}$ and $F_{R10}$ on the blocks 9, 10:

$$F_s + F_L = F_{R9} + F_{R10} \tag{1}$$

$F_{R9}$ and $F_{R10}$ may be resolved as a couple acting on blocks 9, 10. Since the sides of blocks 9, 10 engaged with the cooperating surfaces on plate 4 have a pre-determined frictional coefficient, a frictional force is created by the operation of the couple $F_{R9}$ and $F_{R10}$ on the blocks. Further, since the blocks have frictional member engaging surfaces having an angle α1 and α2, plate 4 also realizes a camming effect as the plate engaging surfaces engage the engaging surfaces 22 and 25. This introduces a sin(α) factor to the frictional force, assuming $F_R$ is a force normal to each block in the plane of plate 4. The frictional force in turn determines the damping effect ζ or:

$$\zeta = \sin\alpha(F_R \mu) \tag{2}$$

where $\mu$ is a coefficient of friction for each frictional member engaging surface and plate engaging surface.

One skilled in the art will readily appreciate that changing the magnitude and direction of the vectors $F_R$, as well as the frictional coefficient of each engaging surface will vary the damping effect. This may also be accomplished by changing any of the relevant variables such as the distance "a" between the spring axis A—A and pulley center $P_c$; the distance "b" between the blocks 9, 10; the distance "c" between the block 9 and the pulley center. Proper selection of each variable allows a user to design the tensioner to operate based on a given set of operational parameters and requirements.

Biasing member axis A—A may also be slightly vertically offset from a plane of the frictional member engaging surfaces, which will vary the damping effect, described herein.

Although a single form of the invention has been described herein, it will be obvious to those skilled in the art that variations may be made in the construction and relation of parts without departing from the spirit and scope of the invention described herein.

We claim:

1. A tensioner comprising:
    a base;
    a frictional member mounted to the base and having frictional member engaging surfaces;
    a plate having a plate engaging surface in sliding engagement with a corresponding frictional member engaging surface, such sliding engagement having a damping effect;
    a biasing member between the base and the plate for biasing the plate against a force;
    the biasing member having an axis;
    a frictional member engaginq surface and corresponding plate engaging surface on each side of the biasing member axis and substantially aligned with the biasing member axis, thereby allowing a linear movement of the plate;
    a pulley having a pulley center journaled to the plate;
    the pulley center is offset a distance (a) normal to the biasing member axis; and
    the distance (a) being greater than a distance of a frictional member engaging surface from the biasing member axis.

2. The tensioner as in claim 1, wherein:
    the pulley having an axis of rotation; and
    the axis of rotation is displaced normally a distance from the biasing member axis.

3. The tensioner as in claim 2, wherein:
    each frictional member engaging surface and corresponding plate engaging surface are displaced normally a distance on opposing sides of the biasing member axis from another frictional member engaging surface and corresponding plate engaging surface.

4. The tensioner as in claim 3, wherein:
    each frictional member engaging surface and corresponding plate engaging surface are displaced axially from each other parallel to the biasing member axis from another frictional member engaging surface and corresponding plate engaging surface.

5. The tensioner as in claim 4, wherein:
    each of the frictional member engaging surfaces and corresponding plate engaging surfaces are substantially flat.

6. The tensioner as in claim 5, wherein:
    each frictional member engaging surface and corresponding plate engaging surface are each at a different distance along the biasing member axis from a biasing member mounting point.

7. The tensioner as in claim 6, wherein each frictional member engaging surface and corresponding plate engaging surface further comprising;
    a pair of surfaces describing an angle to each other and each angle having an apex; and each apex being on opposing sides of the biasing member axis and directed away from the biasing member axis.

8. The tensioner as in claim 7, wherein each frictional engaging surface and corresponding plate engaging surface comprises a pre-determined coefficient of friction.

9. The tensioner as in claim 8, wherein the biasing member, comprises a spring.

10. A tensioner comprising:

a base;

at least two frictional members mounted to the base and each having a frictional member engaging surface;

a plate in sliding engagement with each frictional member engaging surface;

a biasing member disposed between the base and the plate exerting a biasing member force on the plate thereby biasing the plate against a hubload force;

such sliding engagement having a damping effect caused by the biasing member force and the hubload force acting on the plate such that a reaction force is generated on each frictional member engaging surface;

a pulley journaled to the plate;

a pulley center is offset a distance (a) normal to the biasing member axis; and the distance (a) being greater than a distance of a frictional member engaging surface from the biasing member axis.

11. The tensioner as in claims 10, wherein:

the biasing member having an axis; and a frictional member engaging surface disposed on each side of the biasing member axis allowing a movement of the plate substantially parallel with the biasing member axis.

12. The tensioner as in claim 11, wherein:

a frictional member engaging surface is disposed axially parallel to the biasing member axis from the other frictional member engaging surface.

* * * * *